July 18, 1950     A. D. BRYAN ET AL     2,516,045
FILING CONTAINER
Filed March 12, 1948     2 Sheets-Sheet 1
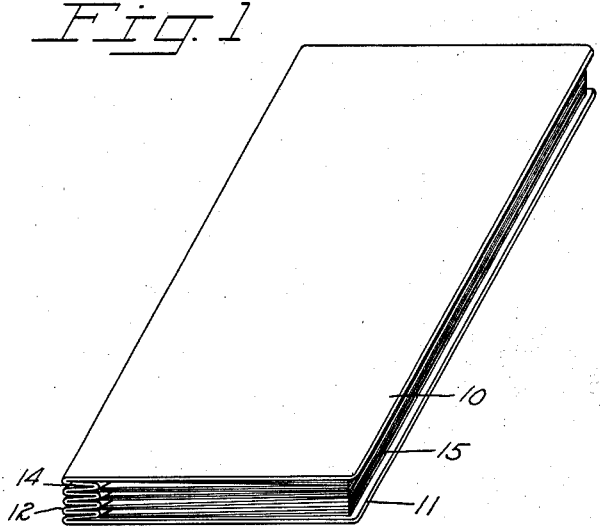
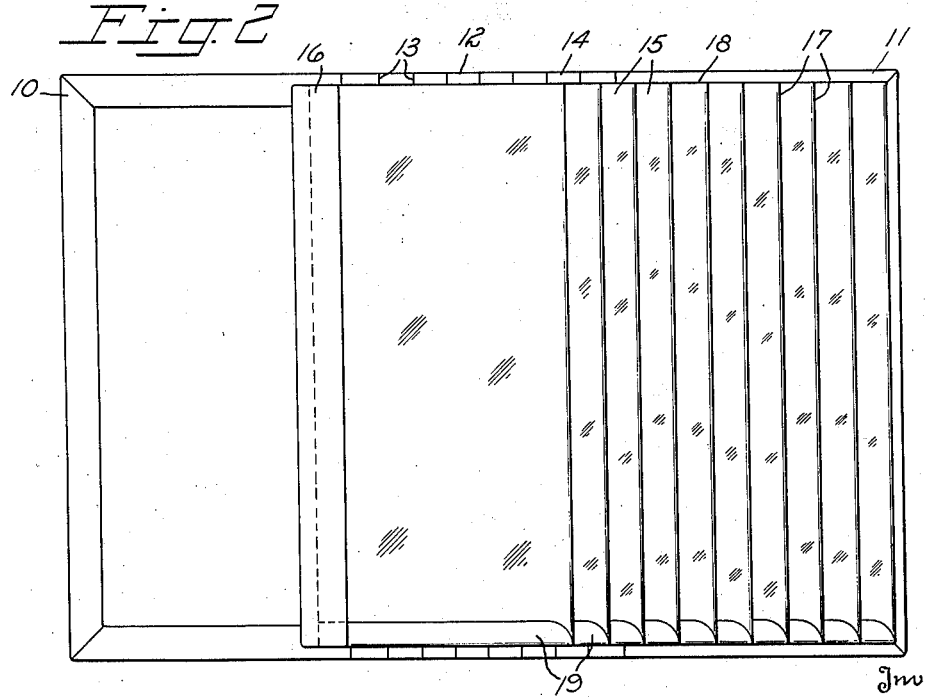
Inventors
AUSTIN D. BRYAN
EDWARD F. GEBELEIN July 18, 1950   A. D. BRYAN ET AL   2,516,045
FILING CONTAINER
Filed March 12, 1948   2 Sheets-Sheet 2
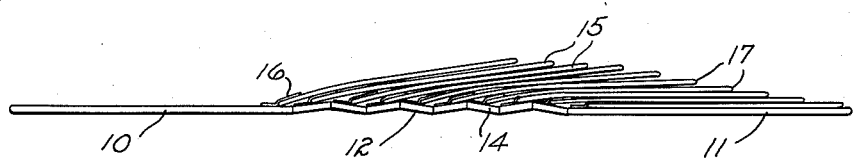
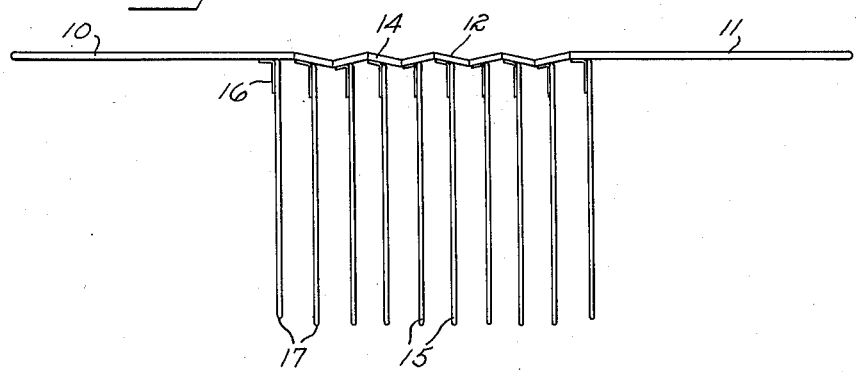
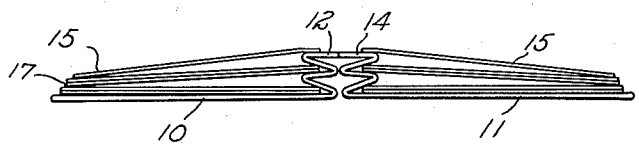
Inventors
AUSTIN D. BRYAN
EDWARD F. GEBELEIN
Attorney Patented July 18, 1950

2,516,045

UNITED STATES PATENT OFFICE 2,516,045

FILING CONTAINER

Austin D. Bryan, Hartford, and Edward F. Gebelein, West Hartford, Conn., assignors to The Aetna Casualty and Surety Company, Hartford, Conn., a corporation of Connecticut Application March 12, 1948, Serial No. 14,408

2 Claims. (Cl. 129—15)

The present invention relates generally to holders for documents and, more particularly, to a combined holder and visible index for containing a plurality of documents in an improved and novel manner.

A specific embodiment of the present invention has been found to have particular utility in actual practice as a combined container and visible index for insurance policies, being characterized by a neat and compact appearance, being easy to carry and manipulate, and providing not only an efficient and readily accessible depository for the policies but also facilitating a quick and efficient reference to the contents thereof.

It is an object of the present invention to provide a holder for documents such as a plurality of insurance policies, which is neat and pleasing in appearance, which is of compact and small size in relation to the documents carried thereby, and which can be readily carried about or stored in a small space.

A further object of the invention is to provide such a holder which is easy to manipulate and in which the contents are readily accessible and visibly indexible so as to permit easy and efficient identification of the contents and reference thereto.

Another object of the invention is to provide such a holder which is of simple and economical construction, which is easy and inexpensive to fabricate, and yet which is of rugged and durable design so that it will give satisfactory service over long periods of time without requiring repair or replacement.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

Figure 1 is a perspective view of an insurance policy holder and visible index embodying the invention, the same being in closed position;

Fig. 2 is a plan view of the holder in an opened position to show the visible indexing function;

Fig. 3 is an end view of the holder as positioned in Fig. 2;

Fig. 4 is an end view of the holder in a second opened position showing certain details of construction; and Fig. 5 is an end view of the holder in a third opened position.

Referring to the drawings in detail, and particularly to Fig. 1 thereof, it will be seen that the device of the present invention when in closed position very closely resembles a book in size and appearance. In the specific embodiment shown, the device is provided with top and bottom cover members 10 and 11 respectively constructed like the covers of a book and hingedly connected to each other along one edge by a binding portion 12 which may be of the same material or a continuation of the covers. The cover members 10 and 11 preferably are generally rectangular in shape and their areas are just slightly larger than that of the documents to be contained to insure adequate protection.

The binding portion 12, which, as previously mentioned, may be a continuation of the cover members 10 and 11, is scored or otherwise made bendable along the lines 13 to form a plurality of hinges 14 connected end to end in series. By reason of this hinged construction of binding portion 12, the holder may be disposed as a closed book as viewed in Fig. 1 with the hinges 14 in closed position and situated one above the other, or the same may be opened and extended as viewed in Figs. 2, 3 and 4 with the hinges 14 in open position and situated in the same plane as the covers 10 and 11, or it may be opened like a book as viewed in Fig. 5 with the hinges 14 in closed position and stacked in two separate columns.

Hingedly secured at both sides of each of the hinges 14 intermediate the lines 13 are a plurality of transparent envelopes 15 for receiving the insurance policies or other documents to be contained. To increase the capacity of the container, an additional envelope 15 may be attached to the inside of each of the covers 10 and 11 at an equivalent distance from the lines 13 forming the inner edges of the covers 10 and 11. In the specific embodiment shown, the envelopes 15 are hingedly secured to the midpoint of the sides of the hinges 14 and to the covers 10 and 11 by flexible connecting strips 16, the latter preferably being made of a material such as cloth or other tape which can be repeatedly flexed, i. e., folded through an arc of approximately 180° without failure and which can be conveniently attached to the hinges 14 and envelopes 15 in a convenient manner such as by gluing, pasting or sewing, etc.

The envelopes 15 may be composed of any suitable transparent material such as cellophane or other readily available plastic of like characteristics and for simplicity of manufacturing may be readily formed from a single sheet folded over to form the closed outer edge 17. Preferably the envelopes 15 are open only at one end 18 for the insertion and withdrawal of the documents, the opposite end 18 being closed by a folded over portion 19.

By reason of the manner in which the envelopes 15 are connected to the binding portion 12 and cover members 10 and 11, the envelopes 15 will be neatly stacked one above the other in alignment when the container is closed as viewed in Fig. 1, or will be spread out with their outer edges 17 in spaced relationship when the container is opened as shown in Figs. 2 and 3, or may be disposed and turned as the pages of a book as shown in Fig. 5. Manipulation of the container is effective from either end, the use of the container being completely reversible. By reason of the fact that the envelopes 15 are secured to both sides of the hinges 14, it is possible to utilize relatively deep hinges 14 without causing the edges 17 of envelopes 15 to be too widely spaced when the container is spread out as in Fig. 2 and the number of hinges is kept to a minimum. Accordingly, the stacking of the hinges when the container is closed as in Fig. 1 is rendered more stable and no fastening means of any kind is normally required to hold the container in such closed position.

Inasmuch as the envelopes 15 are transparent, the insurance policies or other documents inserted into the envelopes 15 may be provided with suitable identifying indicia adjacent the edge 17 such that a visible index of the contents of the various envelopes 15 is immediately provided when the container is disposed as shown in Figs. 2 and 3. Additional data or information may be provided farther inwardly from edge 17 for further identification or details of the contents which also is viewable through the envelopes 15 without requiring removal of the documents and which may be readily referred to simply by turning over the envelopes preceding the instant envelope which it is desired to inspect. The container being reversible, each envelope may be provided with a plurality of documents viewable and indexible from opposite sides of each envelope 15.

It thus will be seen that there has been provided in accordance with the invention a highly useful container of neat and compact appearance for documents such as insurance policies which is easily transportable and convenient to manipulate and which permits rapid and efficient reference as well as ready accessibility to the contents thereof.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

We claim as our invention:

1. A combined container and visible index for documents such as insurance policies comprising a pair of cover plates hingedly connected to each other along one edge by a binding portion in the form of series of interconnected hinges having side members, a plurality of transparent envelopes, and flexible connecting strips hingedly securing one of said envelopes along one edge to each side member of each hinge intermediate the edges of said side members, said strips permitting said envelopes to be pivoted relative to the side members of the hinges through an arc of substantially 180° and one end of said envelopes being open for the reception of said documents.

2. A combined container and visible index for documents such as insurance policies comprising a pair of cover plates, a binding portion in the form of a series of interconnected side by side hinges having side members hinged to each other and hingedly connecting said cover plates, a plurality of transparent envelopes, flexible connecting strips hingedly securing one of said envelopes along one edge to each side member of each hinge intermediate the edges of said side members, said strips permitting said envelopes to be pivoted relative to the side members of the hinges through an arc of substantially 180° and one end of said envelopes being open for the reception of said documents, and one of said transparent envelopes also being secured along one edge to the inside surfaces of each of the cover plates adjacent and spaced from the binding portion.

AUSTIN D. BRYAN.
EDWARD F. GEBELEIN.

REFERENCES CITED

The following references are of record in the file of this patent:

UNITED STATES PATENTS

| Number | Name | Date |
|---|---|---|
| 916,206 | Shedd | Mar. 23, 1909 |
| 1,993,505 | Engel | Mar. 5, 1935 |
| 2,329,007 | Simon et al. | Sept. 7, 1943 |

FOREIGN PATENTS

| Number | Country | Date |
|---|---|---|
| 332,975 | Great Britain | 1930 |